(12) United States Patent
Rick

(10) Patent No.: US 6,521,165 B2
(45) Date of Patent: Feb. 18, 2003

(54) STRIPPER PLATE ASSEMBLY FOR AN INJECTION MOLD WITH CORE LOCK WEDGES

(75) Inventor: Robert F. Rick, Weston (CA)

(73) Assignee: Stackteck Systems Limited ( * ) Notice: Subject to any disclaimer, the term of this patent is extended or adjusted under 35 U.S.C. 154(b) by 44 days.

(21) Appl. No.: 09/828,852

(22) Filed: Apr. 10, 2001

(65) Prior Publication Data
US 2002/0146482 A1 Oct. 10, 2002

(51) Int. Cl.[7] ............................................... B29C 41/42
(52) U.S. Cl. ........................ 264/334; 425/443; 425/556
(58) Field of Search ................................. 425/441, 443, 425/556, DIG. 58, DIG. 129; 264/334

(56) References Cited

U.S. PATENT DOCUMENTS

| | | | | |
|---|---|---|---|---|
| 2,574,223 A | * | 11/1951 | Nichols ....................... 425/554 |
| 3,865,529 A | * | 2/1975 | Guzzo ........................ 425/556 |
| 3,915,613 A | * | 10/1975 | Ruch .......................... 425/438 |
| 3,930,780 A | * | 1/1976 | Lovejoy ...................... 425/249 |
| 4,556,377 A | * | 12/1985 | Brown ........................ 425/138 |
| 5,281,121 A | * | 1/1994 | Tsutsumi et al. ........... 425/116 |
| 6,416,315 B1 | * | 7/2002 | Ciccone ...................... 425/556 |

* cited by examiner

Primary Examiner—Jan H. Silbaugh
Assistant Examiner—Emmanuel Luk
(74) Attorney, Agent, or Firm—Gowling Lafleur Henderson LLP

(57) ABSTRACT

A stripper assembly is provided for stripping a mold part from a core, extending from a core part of an injection mold where the core part has core lock wedges which is disposed thereabout for engaging a corresponding mold cavity and resisting outward movement of an outer edge of the mold cavity. The core lock wedges are spaced apart to provide respective openings between adjacent ends of the adjacent wedges. A stripper plate extends about the core and has acutator attachment regions extending through the openings.

12 Claims, 12 Drawing Sheets

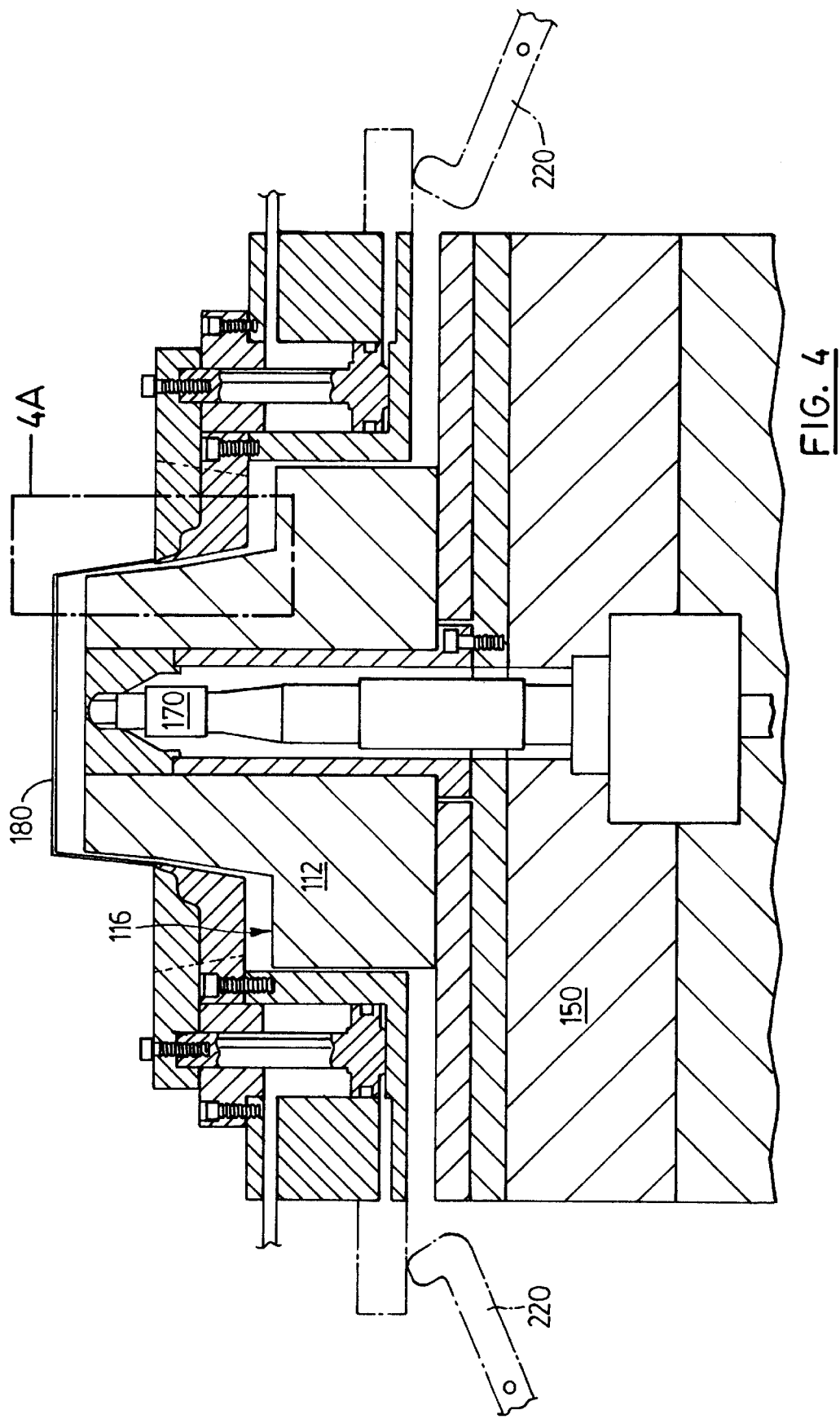

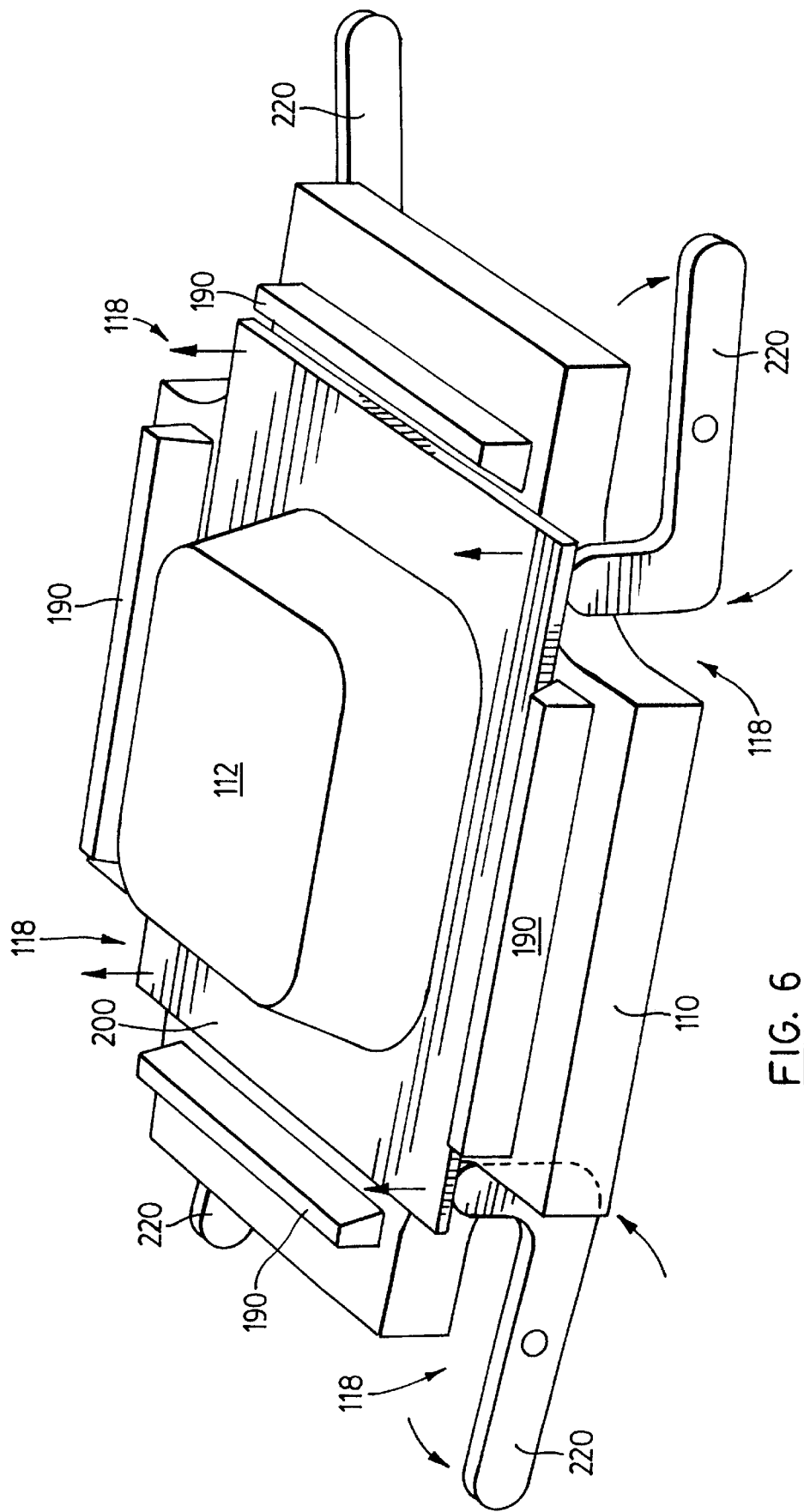

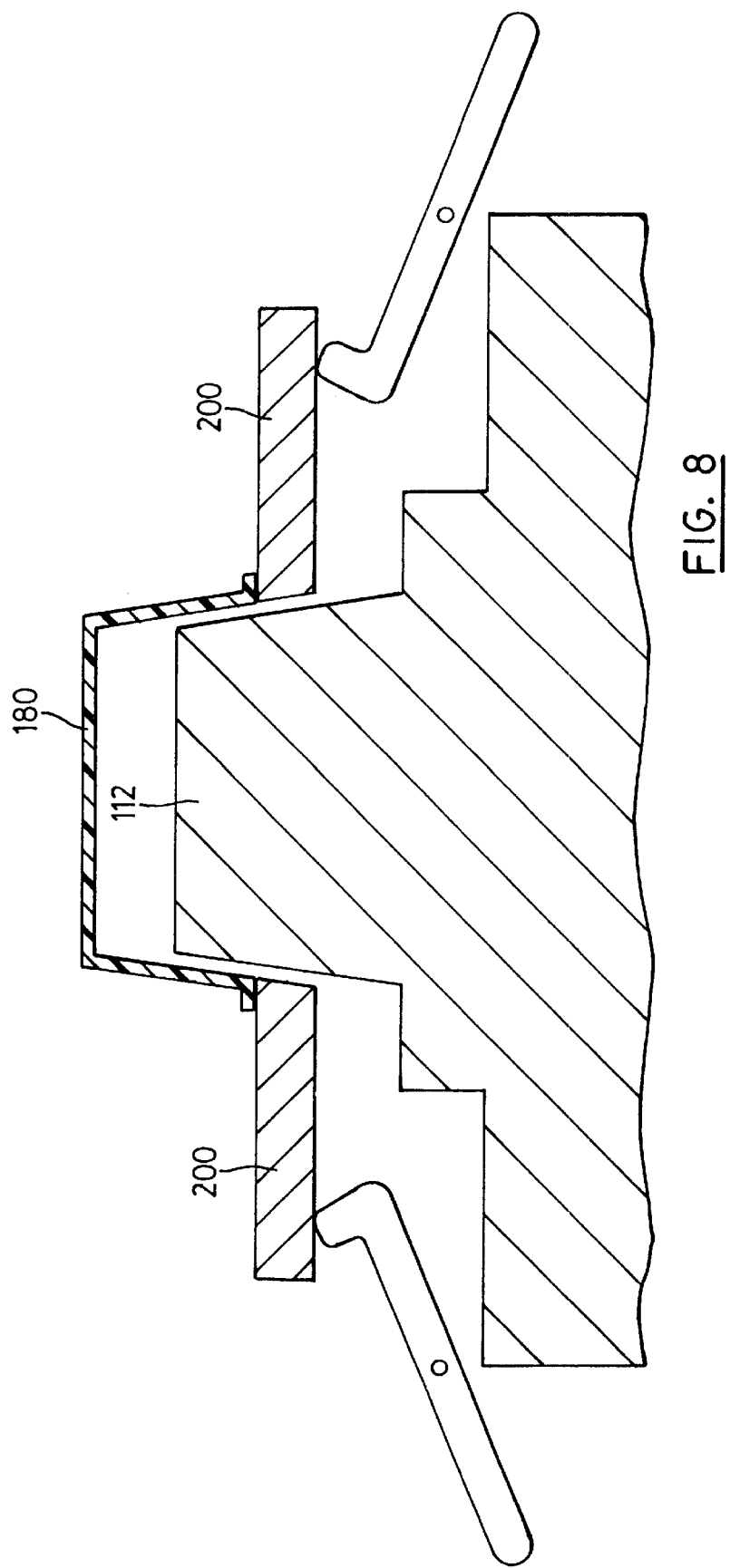

STRIPPER PLATE ASSEMBLY FOR AN INJECTION MOLD WITH CORE LOCK WEDGES

FIELD OF THE INVENTION

This invention relates generally to injection molding molds. More specifically, this invention relates to the stripping of molded parts from an injection mold featuring core lock wedges on a core portion thereof.

BACKGROUND OF THE INVENTION

Injection molding basically involves the injection of a molten material, such as a plastic into a space defined between a core and a cavity of an injection mold. The core is typically an outward projection from a core portion of the mold. The cavity is typically a recess extending into a cavity portion of the mold. After injection the molten material is allowed to cool and solidify subsequent to which the core portion and cavity portion of the mold are separated in a longitudinal direction. As cooling and solidification of the part is generally accompanied by some shrinkage, the part usually shrinks onto the core from which it has to be removed or "stripped".

Various methods and apparatus are used for stripping parts, the selection of which depends upon practical considerations such as the configuration of the part to be stripped and space available. A stripping assembly which is often desired for thin wall containers and other cup shaped parts is called a stripper plate. A stripper plate, as the name suggests is a plate which lies against the core portion during molding, extends about each core, and engages an outer edge or lip of the molded part. The stripper plate may in fact define a portion of a mold face of the core. This initial position is referred to herein as the "molding position".

The stripper plate is axially movable relative to the core by any suitable actuator connected thereto, such as a pressurized fluid displaceable piston or a linkage arm. As the stripper plate is urged away from the core portion, it presses against the part (usually a lip of the part) and urges the part off of the core. Stripper plates are desirable because they are relatively inexpensive (compared for example to pin ejection systems), reliable (compared to air ejection systems) and require minimal height and minimal changeover times.

A problem encountered with thin wall containers, particularly with relatively large ones, is a tendency of the outer edge of the cavity to flex laterally outwardly in response to the pressure of the molten material being injected, thereby causing the wall of the part to be unduly thick toward its outer edges. One way to combat this flex of the cavity is with "core lock wedges". Core lock wedges are protrusions which extend about the core and abut against an outer perimeter of the cavity to prevent radial outward movement of the outer end of the cavity. A single "wedge" may be used which extends continuously about the cavity in which case the mold is referred to as having a "ring lock core". The present invention relates to wedge lock cores in which a plurality of spaced apart wedges are provided.

FIG. 1A is a perspective view of a prior art wedge lock core on a core part which is illustrated generally by reference 20. The core part 20 has a core 22 extending from a core face 24. Disposed about the core 22 and also extending from the core face 24 are four core lock wedges 26. Although four are shown in this illustrative example, it will be understood by persons skilled in such structures that other numbers are possible.

FIG. 1B is a section on line 2—2 of FIG. 1A additionally showing a cavity part 30 of a mold (the cavity part 30 does not appear in FIG. 1). The cavity part 30 has a cavity 32 extending therefrom with an outer end 34 distal the cavity part 30.

FIG. 1B illustrates the core 32 and the cavity 22 in a molding configuration in which the core lock wedges 26 engage the outer ends 34 of the core 30 to resist outward lateral movement in the direction of arrows 36.

Until the present invention, a problem associated with wedge lock cores has been the inability to use a stripper plate. The presence of the core lock wedges 26 interferes with placing a stripper plate on the core face 24 and accordingly, the stripper plate is replaced with a stripper ring. FIG. 1C is a sectional view corresponding to FIG. 1B of a prior art stripper ring 40. The stripper ring 40 extends between the core 22 and the core lock wedges 26. As the stripper ring 40 does not extend to edges 28 of the core part 20, its actuation cannot be from adjacent the edges 28 as with a conventional stripper plate. Accordingly, the prior art solution has been to provide an ejector box 50 behind the core part 20 and connect the stripper ring 40 to an ejector plate 52 with ejector rods 54. The ejector plate 52 and in turn the ejector rods 54 and stripper ring 40 are moved by ejector cylinders 56 also connected to the ejector plate 52.

While the use of an ejector box 50 provides a workable arrangement, it has the disadvantage that the ejector box adds significantly to the height of the mold and accordingly, reduces the number of levels that may be provided in a stack mold.

An object of the present invention is to provide a stripper plate assembly actuatable without an ejector box for use with a wedge lock core.

SUMMARY OF THE INVENTION

A stripper assembly is provided for stripping a mold part from a core, extending from a core part of an injection mold where the core part has core lock which is disposed thereabout for engaging a corresponding mold cavity and resisting outward movement of an outer edge of the mold cavity. The core wedges are spaced apart to provide an opening between adjacent ends of the adjacent wedges.

The stripper assembly includes a stripper plate extending about a base of the core to engage a part formed on the core and is longitudinally moveable relative to the core by an actuator connected to the stripper plate, between a molding configuration in which the part is formed on the core and a stripping configuration for removing the part from the core.

The stripper plate has actuator attachment range extending through the openings between the core lock wedges to provide for attachment of the actuator thereto. The actuator is disposed laterally outwardly of the adjacent ends of the core lock wedges to move the stripper plate between the molding and stripping configurations with the core part being mounted directly to a respective part of an injection molding machine.

The actuator may include a fluid pressure response of piston slidably mounted within a bore extending into the core part adjacent at least one of the actuator attachment regions, with the piston being connected to the stripper plate.

The actuator may include two or more such pistons, each of the pistons being associated with a different one of the actuator attachment regions.

The stripper plate may have one of the actuator attachment regions at each corner thereof and respective of the pistons associated therewith. The actuator attachment regions may extend laterally beyond the confines of the injection mold and the actuator may include at least one lever arm acting between the stripper plate and the core part of the injection mold to move the stripper plate away from the core part in response to the injection mold moving from its molding to a stripping configuration.

The actuator may include two such lever arms, each of which is associated with a different one of the actuator attachment regions.

The stripper plate may have one of the actuator attachment regions at each corner thereof and a respect of the lever arms associated with each of the actuator attachment regions.

The stripper plate may include an inner plate adjacent, the core part and an outer plate adjacent the inner plate. The stripper plate is moveable by the actuator in a first stage wherein the inner and outer plates move together and further moveable by the actuator in a second stage, wherein the outer plate is moved away from the inner plate.

The first and second plates may act as an outer end of the cavity associated with the core for the forming of an outer edge of the molded part between the inner and outer plates and the core. The actuator may include first stage actuator coupled to the inner plate for moving the stripper plate in a first stage and a second stage actuator coupled to the outer plate for moving the stripper plate in the second stage.

The inner plate may include inner plate actuator attachment regions extending laterally beyond the core of the injection mold. The first stage actuator may include respective lever arms acting between the inner plate and the core part on at least two diametrically opposed of the first actuator attachment regions to move the stripper plate away from the core part in response to the injection mold moving from its molding to a stripping configuration. The outer plate may include at least two diametrically opposed second actuator attachment regions. The second stage actuator may include a respective fluid pressure responsive pistons slidably mounted within corresponding bore extending into the core part, adjacent each of the second actuator attachment regions.

A method is also provided for stripping apart from a core extending from core of injection mold where the core part has core lock wedges disposed thereabout for engaging and resisting outward lateral movement of an outer and of a corresponding mold cavity. The core lock wedges are spaced apart to provide respective openings between adjacent ends of adjacent core lock wedges. The method includes the steps of:
1. Providing a stripper plate extending about a base of the core for engaging a part formed between the core, the cavity and the stripper plate;
2. Providing the stripper plate with actuator attachment regions which extend through the respective openings between the adjacent of the core lock wedges; and
3. Applying a stripping force to the actuator attachment regions laterally outwardly of the core to move the stripper plate longitudinally relative to the core with an actuator mounted ahead of a mounting face of the core, and disposed laterally outwardly of the core.

According to one embodiment of the method, the stripper plate may further include an inner plate adjacent to the base of the core and an outer plate adjacent the inner plate. The actuator attachment regions may include first actuator attachment regions for movement of the inner plate and second actuator attachment regions for movement of the outer plate. The stripping force in step 3 may be first applied to the first actuator attachment regions to cause the inner and outer plates to move together. The stripping force in step 3 may subsequently be applied to the second actuator regions to cause the outer plate to move away from the inner plate.

DESCRIPTION OF THE DRAWINGS

Preferred embodiments of the present invention are described below with reference to the accompanying drawings in which:

FIG. 4 is a section corresponding to FIG. 3 showing a first stage of movement of an ejector assembly according to the present invention;

FIG. 6 is a perspective view of a single stage ejector assembly according to the present invention mounted on a core part of a mold and showing an alternate embodiment of an actuator assembly;

DESCRIPTION OF PREFERRED EMBODIMENTS

Figure 1A:
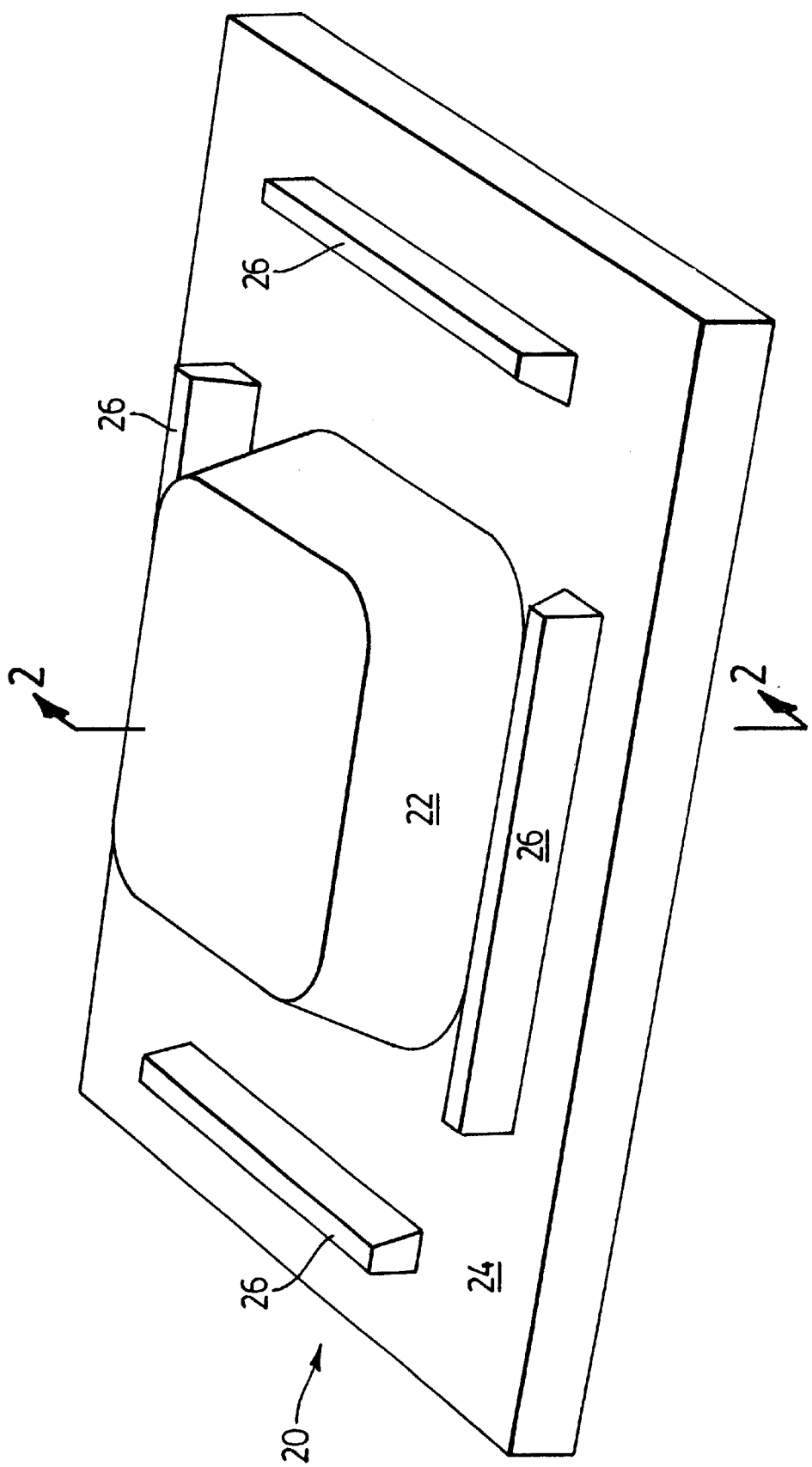
FIG. 1A is a perspective view illustrating a typical prior art wedge lock core.
Figure 1B:
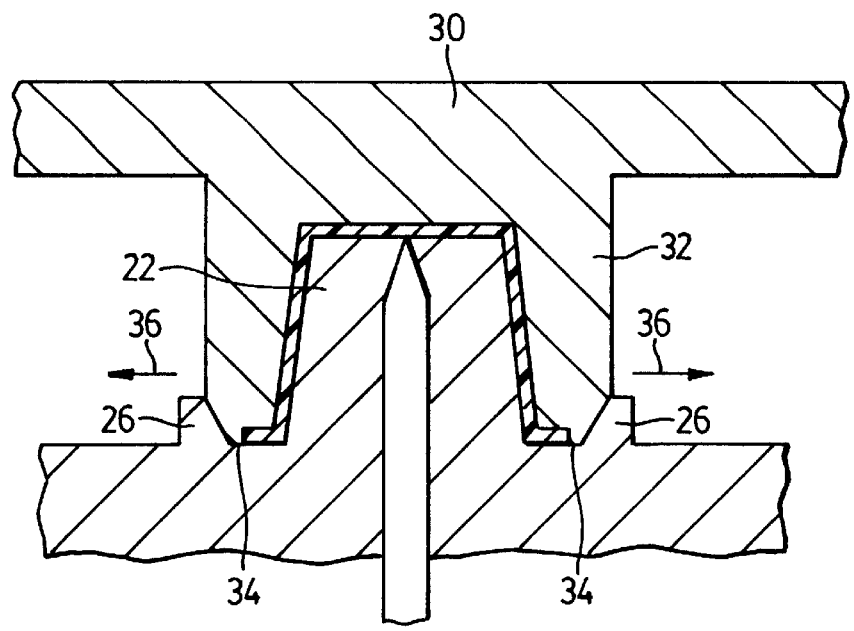
FIG. 1B is a section on line 2—2 of FIG. 1.
Figure 1C:
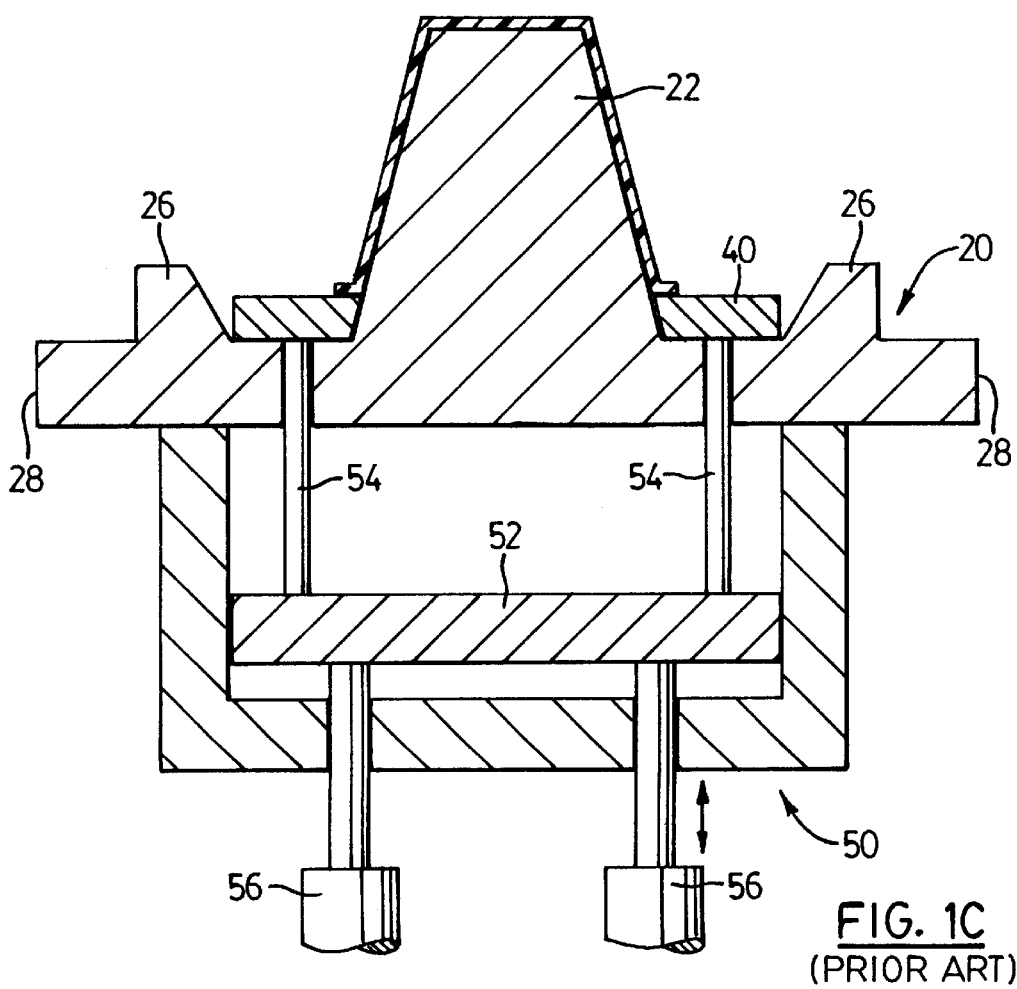
FIG. 1C is a sectional view corresponding to FIG. 1B additionally showing an ejector box and ring.

A mold assembly according to the present invention is generally indicated by reference 100. The mold assembly includes a core part 110 and a cavity part 120. The core part 110 includes at least one core 112 extending from a core face 114 thereof. The core part 110 is secured to a platen 150 which may be fixed or movable depending on whether a single level or a multi-level stack mold is being used.

Figure 2A:
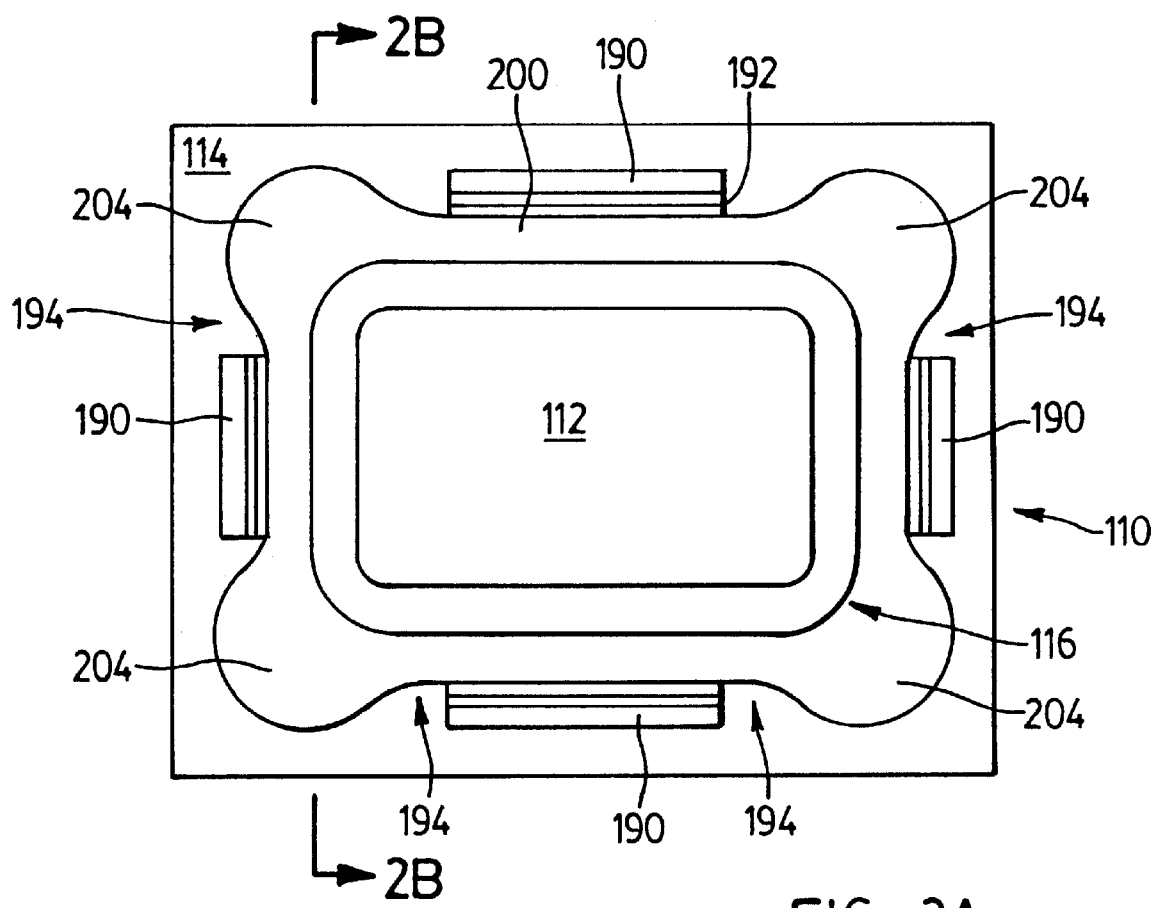
FIG. 2A is a plan view of the core part of a mold having a stripper plate assembly according to the present invention.
Figure 2B:
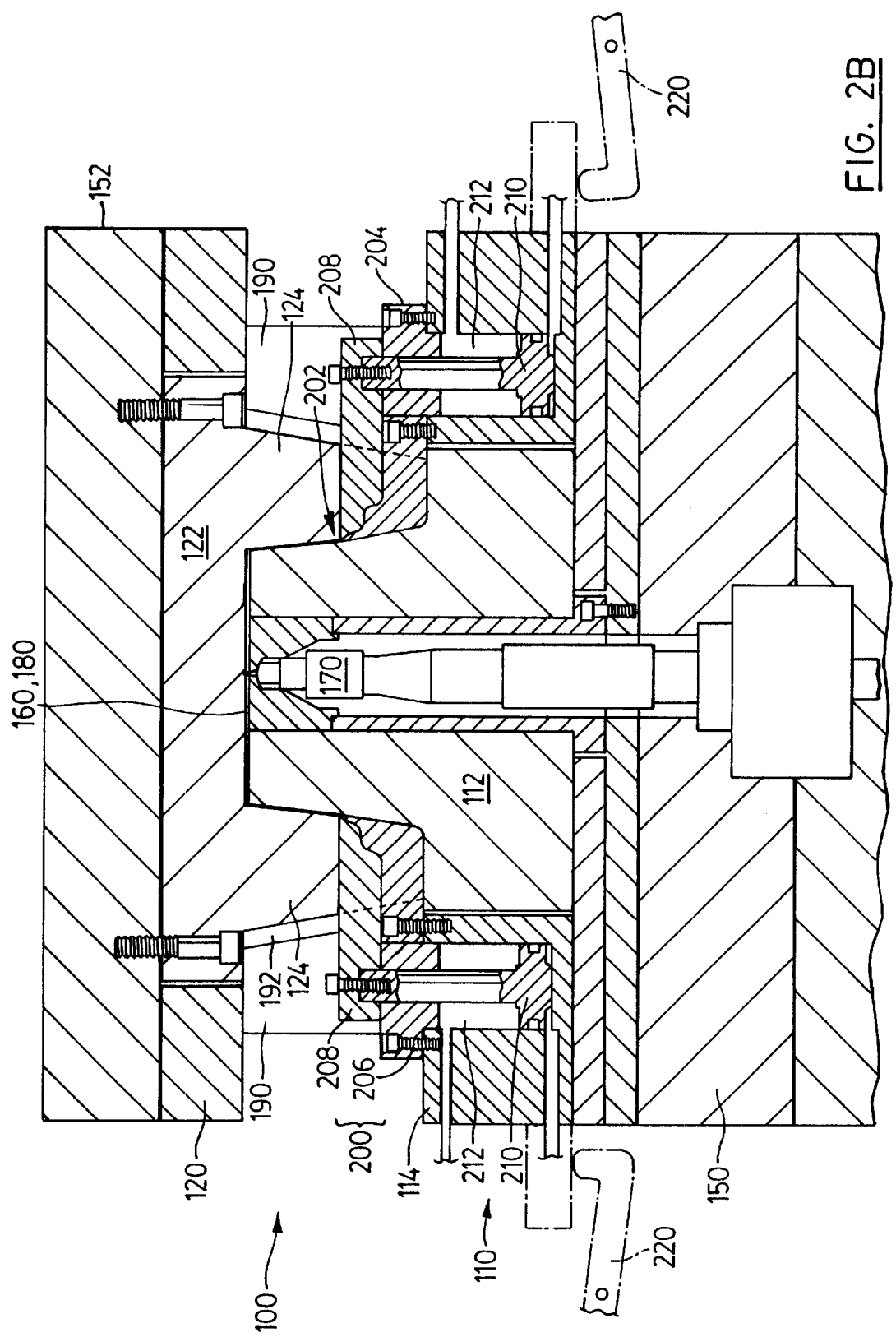
FIG. 2B is a section on line 2B—2B of FIG. 2 and also illustrating a cavity part of the mold.
Figure 3:
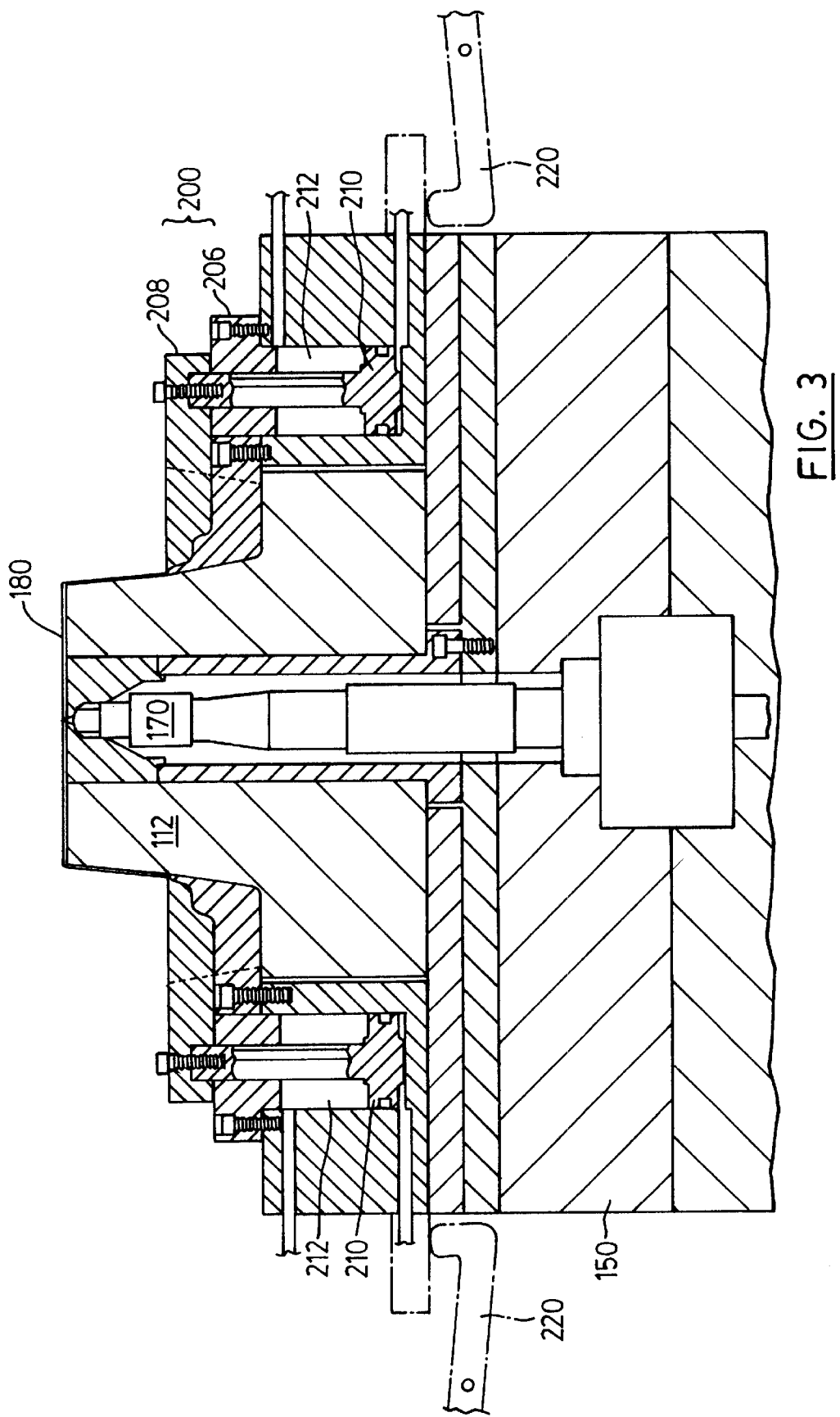
FIG. 3 is a section corresponding to FIG. 2B but showing the cavity part removed.

The cavity part 120 includes a cavity 122 opposite the core 112. The cavity part 120 is secured to a platen 152. The cavity 122 and core 112 are movable by at least one of their respective platens 152 and 150 relative to each other between a molding configuration shown in FIGS. 2B, 3 and 7 and a stripping configuration shown in FIGS. 4 and 8. In the molding configuration a space 160 is defined between the core 112 and cavity 122 into which space 160 molten plastic is injected through a nozzle 170 to form a part 180.

The core part 110 includes core lock wedges 190 spaced apart from the core 112 and extending from the core face 114. The core lock wedges 190 have wear plates 192 which engage an outer end 124 of the cavity when the mold is in its molding configuration. The wear plates 192 are of a softer material than the core 112 (for example, brass) and both protect the outer end 124 of the cavity 122 from wear and provide a replaceable wear part. The core lock wedges 190 are spaced apart to provide an opening 194 therebetween.

A stripper plate 200 is provided which extends around a base 116 of the core 110. The stripper plate rests on the core face 114 when the mold is in the molding position. The stripper plate is movable away from the core face 114 into a stripping configuration. The stripper plate 200 has a lip 202 which engages an edge 182 of the part 180 to move the part 120 off of the core 112 away from the core face 114.

Unlike a stripper ring, the stripper plate 200 has actuator attachment regions 204 which extend through the openings 194 between the core lock wedges 190. The attachment regions 204 allow the stripper plate 200 to be acted upon by a stripper ring actuator such as fluid pressure responsive pistons 210 mounted within the bores 212 in the core part 110 of the mold 100. The pistons 210 and their bores 212 are disposed laterally outwardly of the ends of the core lock wedges 190.

Figure 7:
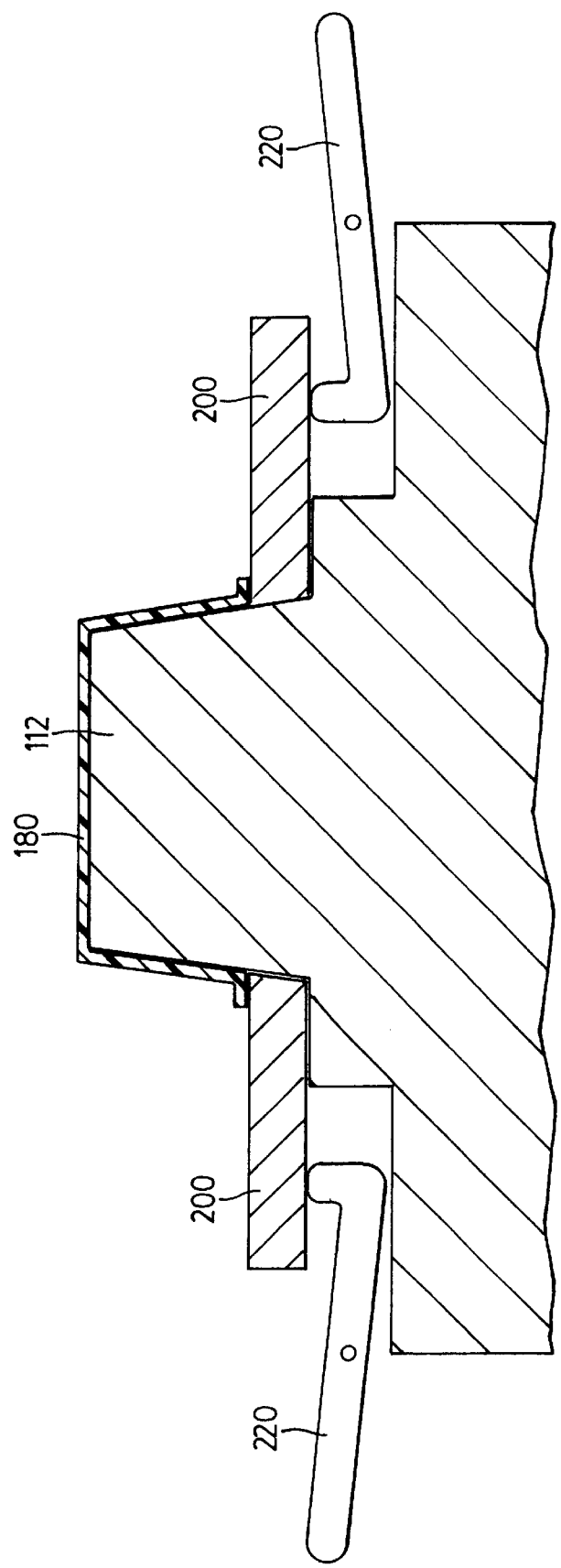
FIG. 7 is a partial sectional view corresponding to FIG. 6 and showing lever arm actuators in a position corresponding to a molding configuration of the stripper plates; and, FIG. 8 is a view corresponding to FIG. 7 but showing the lever arms in a stripping configuration.

An alternate stripper ring actuator is a lever arm 220 as shown in FIGS. 6, 7 and 8. The lever arm(s) 220 may be carried on a separate actuator carriage such taught by U.S. Pat. No. 6,086,355. In order to use a lever arm 220 as an actuator, the core part 110 would typically be relieved in its corners 118 to provide access for the lever arm 220 to engage the actuator attachment regions 204.

FIGS. 6 through 8 show a single stage stripper plate in which stripping is accomplished by a single motion of the entire stripper plate 200 from its molding to its stripping configurations. FIGS. 2B through 5a illustrate a more complex arrangement in which the stripper plate 200 is made up of an inner plate 206 adjacent the core face 114 and an outer plate 208 on the face of the inner plate 206 opposite the core face 114. Such an arrangement is referred to as a two-stage stripper plate as the inner plate 206 and outer plate 208 are initially moved together in a "first" stage and the outer plate 208 is moved away from the inner plate 206 in a second stage.

Figure 4A:
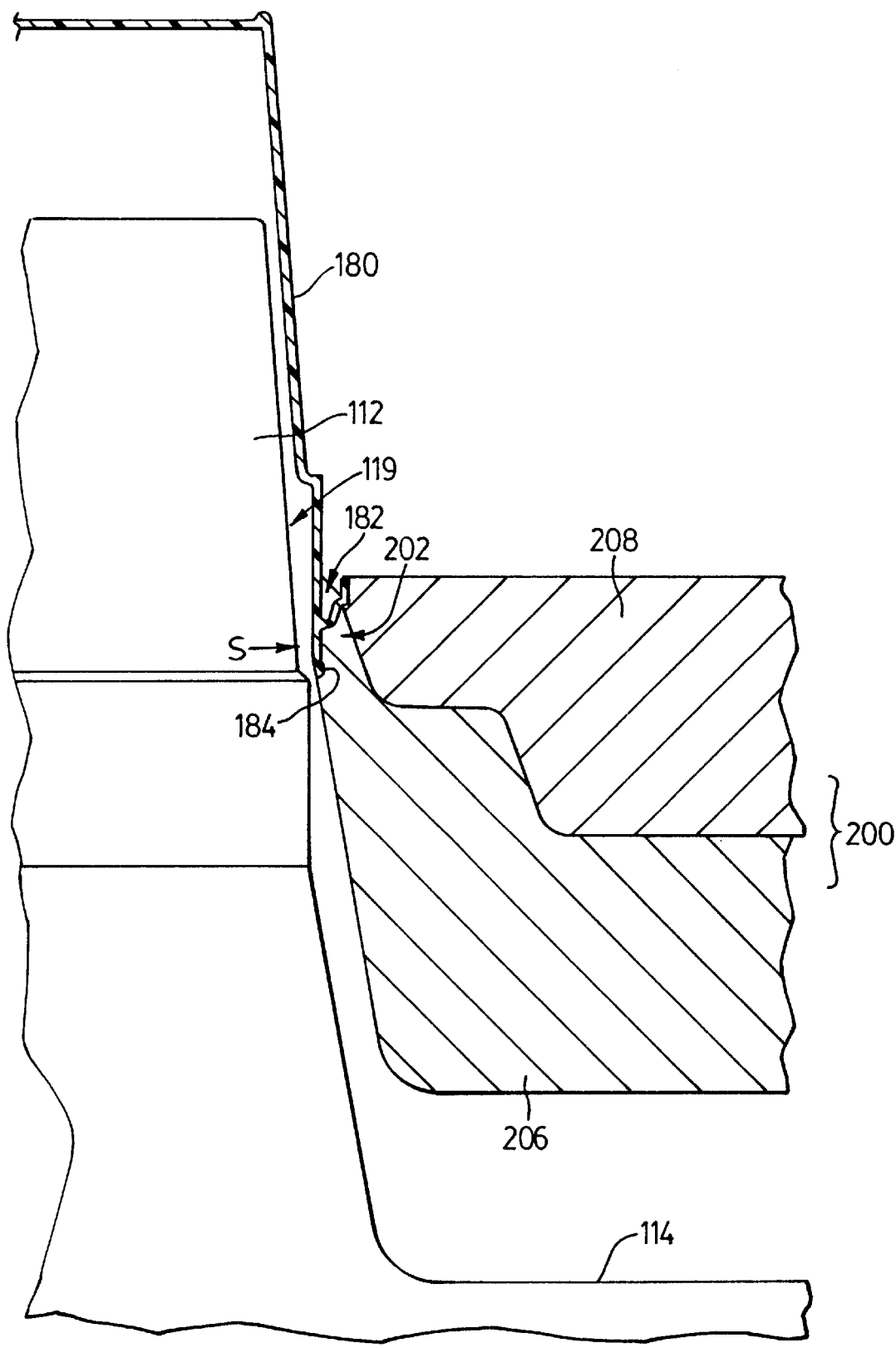
FIG. 4a is an enlargement of the area indicated in the box labelled 4a in FIG. 4.
Figure 5:
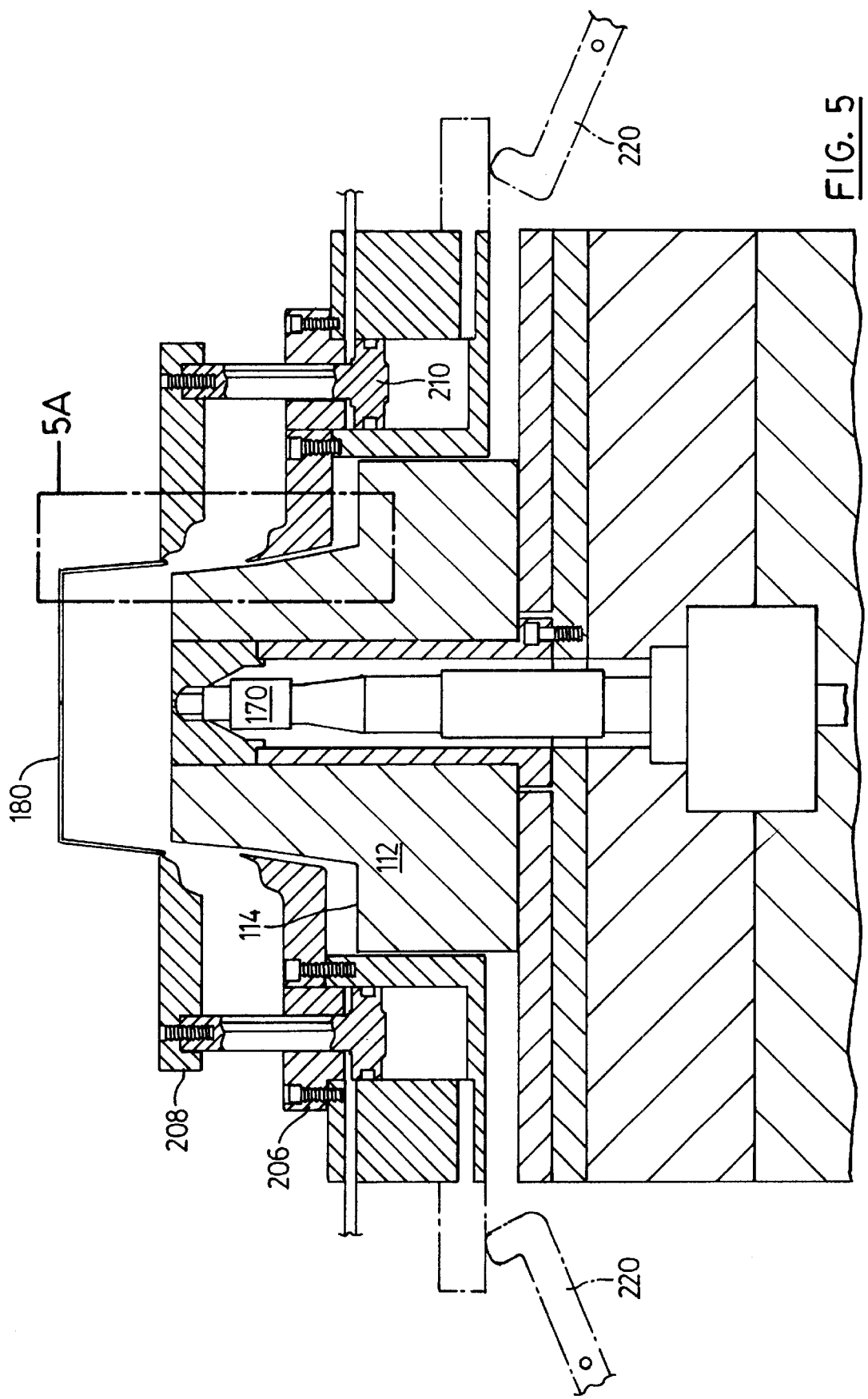
FIG. 5 is a section corresponding to FIGS. 3 and 4 but showing a second stage of movement of the ejector assembly.
Figure 5A:
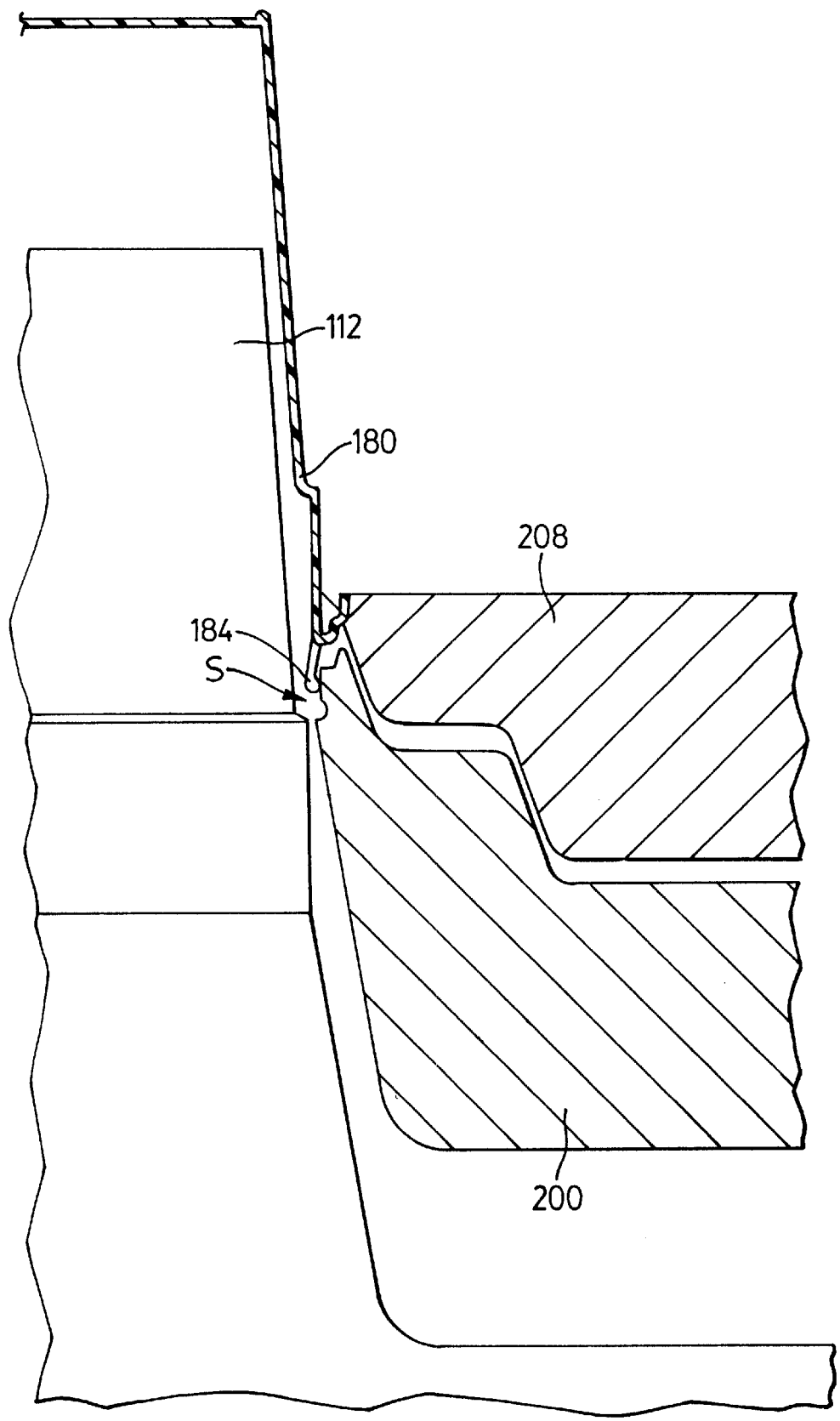
FIG. 5a is an enlargement of the area in the box labelled 5a in FIG. 5.

Two stage stripper plate arrangements are required for certain shapes of the part 180. Such a shape is illustrated in the enlargement of FIGS. 4a and 5a. The edge of the part 180 has an outwardly projecting lip 184 which is formed between the core and the inner plate 206. The lip 184 causes the part to nest within the inner plate 206 and therefore, while movement of the inner plate 206 away from the core face 114 will cause the part 180 to lift away from the core, it will still remain with the inner plate 206.

If an attempt were made to strip the part 180 using only the outer stripper plate 208, the lip 184 would get sheared off as there is no room for it to pass between the inner plate 206 and the core 112 while the inner plate 206 rests against the core face 114.

With two stage stripping, as illustrated in FIGS. 4 and 4a, both the inner stripper plate 206 and outer striper plate 208 are moved simultaneously for a first stage of stripping. This lifts the part 180 along and away from the core 112, to a region 119 wherein there is adequate space S between the core 112 and the inner stripper plate 206 to accommodate the lip 184. At this point the inner stripper plate 206 ceases to advance while the outer stripper plate 208 is advanced as shown in FIGS. 5 and 5a to separate the part 180 from the inner stripper plate 206 by having the lip deflect radially inwardly into the space S and out of engagement with the inner stripper plate 206. Once out of engagement with the inner stripper plate 206, the part 180 is free to fall clear.

The above description is intended in an illustrative rather than a restrictive sense and variations may be apparent to persons skilled in the relevant art without departing from the spirit of the invention as defined by the claims set out below.

What is claimed is:

1. A stripper assembly for stripping a molded part from a core extending from a core part of an injection mold where said core part has core lock wedges disposed about said core for engaging a corresponding mold cavity to resist outward movement of an outer edge of said mold cavity and said core wedges are spaced apart to provide an opening between adjacent ends of adjacent wedges, said stripper assembly comprising:

a stripper plate extending about a base of said core to engage a part formed on said core and being longitudinally movable relative to said core by an actuator connected to said stripper plate between a molding configuration in which said part is formed on said core and a stripping configuration for removing said part from said core;

said stripper plate having actuator attachment regions extending through said openings between said core lock wedges to provide for attachment of said actuator thereto;

said actuator being disposed laterally outwardly of said adjacent ends of core lock wedges to move said stripper plate between said molding and stripping configurations with said core part being mounted directly to a respective platen of an injection molding machine.

2. A stripper assembly as claimed in claim 1 wherein:
said actuator includes a fluid pressure responsive piston slidably mounted within a bore extending into said core part adjacent at least one of said actuator attachment regions, said piston being connected to said stripper plate.

3. A stripper ring assembly as claimed in claim 2 wherein:
said actuator includes at least two of said pistons, each of said at least two pistons being associated with a different one of said actuator attachment regions.

4. A stripper ring assembly as claimed in claim 3 wherein:
said stripper plate has one of said actuator attachment regions at each corner thereof and a respective of said pistons associated therewith.

5. A stripper assembly as claimed in claim 1 wherein:
said actuator attachment regions extend laterally beyond said core part of said injection mold, said actuator includes at least one lever arm acting between said stripper plate and said core part of said injection mold to move said stripper plate away from said core part in response to said injection mold moving from said molding to said stripping configurations.

6. A stripper mechanism as claimed in claim 5 wherein:
said actuator includes at least two of said lever arms, each of which is associated with a different one of said actuator attachment regions.

7. A stripper mechanism as claimed in claim 6 wherein:
said stripper plate has one of said actuator attachment regions at each corner thereof and a respective of said lever arms associated with each of said actuator attachment regions.

8. A stripper mechanism as claimed in claim 1 wherein:
said stripper plate includes an inner plate adjacent said core part and an outer plate adjacent said inner plate;
said stripper plate is movable by said actuator in a first stage wherein said inner and said outer plates move together;

said stripper plate is further movable by said actuator in a second stage wherein said outer plate is moved away from said inner plate.

9. A stripper mechanism as claimed in claim 8 wherein:

said first and second plates act as an outer end of a cavity associated with said core for the forming of an outer edge of a molded part between said inner and outer plates and said core;

said actuator includes a first stage actuator coupled to said inner plate for moving said stripper plate in said first stage; and, said actuator includes a second stage actuator coupled to said outer plate for moving said stripper plate in said second stage.

10. A stripper mechanism as claimed in claim 9 wherein:

said inner plate includes inner plate actuator attachment regions extending laterally beyond said core of said injection mold;

said first stage actuator includes a respective lever arms acting between said inner plate and said core part on at least two diametrically opposed of said first actuator attachment regions to move said stripper plate away from said core part in response to said injection mold moving from said molding to said stripping configuration; and, said outer plate includes at least two diametrically opposed second actuator attachment regions;

said second stage actuator includes a respective fluid pressure responsive piston slidably mounted within corresponding bores extending into said core part adjacent each of said at least two diametrically opposed of said second actuator attachment regions.

11. A method for stripping a core part from a core extending from a core of an injection mold where said core part has core lock wedges disposed thereabout for engaging and resisting outward lateral movement of an outer end of a corresponding mold cavity, said core lock wedges being spaced apart to provide respective openings between adjacent ends of adjacent core lock wedges, said method comprising the steps of:

(i) providing a stripper plate extending about a base of said core for engaging a part formed between said core, said cavity and said stripper plate;

(ii) providing said stripper plate with actuator attachment regions which extend through said respective openings between adjacent of said core lock wedges; and, (iii) applying a stripping force to said actuator attachment regions laterally outwardly of said core to move said stripper plate longitudinally relative to said core with an actuator mounted ahead of a mounting face of said core part and disposed laterally outwardly of said core.

12. A method according to claim 11 wherein:

said stripper plate further includes an inner plate adjacent said base of said core and an outer plate adjacent said inner plate;

said actuator attachment regions include first actuator attachment regions for movement of said inner plate and second actuator attachment regions for movement of said outer plate;

said stripping force in step (iii) is first applied to said first actuator attachment regions to cause said inner and outer plates to move together; and, said stripping force in step (iii) is subsequently applied to said second actuator attachment regions to cause said outer plate to move away from said inner plate.

* * * * *